(12) United States Patent
Wheeler et al.

(10) Patent No.: US 7,211,129 B2
(45) Date of Patent: May 1, 2007

(54) INKJET INK SET

(75) Inventors: James Walter Wheeler, West Chester, PA (US); John Stephen Locke, Hockessin, DE (US); Samit N. Chevli, Hockessin, DE (US); Sandra Laurine Issler, Newark, DE (US); Alicia Marie Walsh, Wilimingon, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 161 days.

(21) Appl. No.: 11/173,595

(22) Filed: Jul. 1, 2005

(65) Prior Publication Data

US 2007/0002110 A1    Jan. 4, 2007

(51) Int. Cl.
*C09D 11/02* (2006.01)
*B41J 2/01* (2006.01)

(52) U.S. Cl. .................................. 106/31.27; 347/100

(58) Field of Classification Search ............. 106/31.27; 347/100
See application file for complete search history.

(56) References Cited

U.S. PATENT DOCUMENTS

| 5,847,740 | A | | 12/1998 | Yamamoto et al. | |
|---|---|---|---|---|---|
| 6,508,549 | B1 | * | 1/2003 | Romano et al. | 347/100 |
| 6,513,923 | B1 | * | 2/2003 | Evans et al. | 347/100 |
| 6,656,228 | B1 | | 12/2003 | Sherwin et al. | |
| 2002/0081421 | A1 | | 6/2002 | Bagwell et al. | |
| 2004/0266909 | A1 | * | 12/2004 | Segawa | 523/160 |
| 2005/0171239 | A1 | * | 8/2005 | Bauer et al. | 523/160 |
| 2005/0171240 | A1 | * | 8/2005 | Bauer et al. | 523/160 |
| 2005/0203210 | A1 | * | 9/2005 | Kataoka et al. | 523/160 |
| 2006/0232651 | A1 | * | 10/2006 | Sugimoto et al. | 347/100 |

OTHER PUBLICATIONS

Derwent abstract of JP 09/111673, Apr. 1997.*

* cited by examiner

*Primary Examiner*—Helene Klemanski
(74) *Attorney, Agent, or Firm*—Steven C Benjamin; Bart E. Lerman

(57) ABSTRACT

The present invention pertains to a dye-based inkjet ink set and, more particularly, to a dye-based inkjet ink set suitable for printing on polyamide fabric. The present invention also pertains to a method for printing a polyamide fabric with the dye-based inkjet ink set, and a polyamide fabric so printed.

18 Claims, No Drawings

INKJET INK SET

BACKGROUND OF THE INVENTION

The present invention pertains to a dye-based inkjet ink set and, more particularly, to a dye-based inkjet ink set suitable for printing on polyamide fabric.

Digital printing methods such as inkjet printing are becoming increasingly important for the printing of textiles and offer a number of potential benefits over conventional printing methods such as screen printing. Digital printing eliminates the set up expense associated with screen preparation and can potentially enable cost effective short run production. Inkjet printing furthermore allows visual effects, like infinite pattern repeat sizes, that cannot be practically achieved with a screen printing process.

One area of textile printing ideally suited to digital printing is the flag and banner market where short runs are common. However, printing of flags and banners presents unique challenges. For example, ink is printed on one side, but must penetrate the fabric so that the image is equally visible on the back (unprinted) side as on the front (printed) side. In addition, while the ink must travel through the fabric, it must not travel laterally causing blurring and bleeding. This seemingly contradictory set of conditions is not easily achieved. Furthermore, the printed products will typically be displayed in sunny areas and the colorants in the inks are preferably resistant to light fade.

U.S. Pat. No. 5,847,740 discloses an inkjet printing process on nylon cloth. Co-pending and commonly owned U.S. application Ser. No. 11/070711 (filed Mar. 2, 2005) discloses flag and banner printing methods and pretreatment solutions therefor. The disclosures of these documents are incorporated by reference herein for all purposes as if fully set forth.

It is an object of this invention to provide an inkjet ink set having good gamut, light-fastness and penetration properties that is advantageous for printing on polyamide fabric.

SUMMARY OF THE INVENTION

In one aspect, the present invention pertains to a dye-based inkjet ink set comprising at least two differently colored inks, wherein at least one of the inks (a first ink) is a violet ink comprising Acid Violet 48 dye in an aqueous vehicle. In a preferred embodiment, the first ink comprises the Acid Violet 48 dye in an amount of from about 4 wt % and about 8 wt %, based on the total weight of ink.

In one preferred embodiment, the ink set comprises one or more of inks (a) through (g) defined as follows:

(a) a yellow ink comprising Acid Yellow 79 dye (preferably from about 7 wt % to about 11 wt %) in an aqueous vehicle;

(b) a navy ink comprising Acid Blue 113 dye (preferably from about 4 wt % to about 8 wt %) in an aqueous vehicle;

(c) a blue ink comprising Acid Blue 260 (preferably from about 4 wt % to about 8 wt %) in an aqueous vehicle;

(d) a cyan ink comprising Acid Blue 185 (preferably from about 2 wt % to about 6 wt %) in an aqueous vehicle;

(e) a black ink comprising Acid Black 194 (preferably from about 6 wt % to about 10 wt %) in an aqueous vehicle;

(f) a magenta ink comprising Reactive Red 245 (preferably from about 8 wt % to about 12 wt %) in an aqueous vehicle; and/or (g) an orange ink comprising Reactive Orange 13 (preferably from about 8 wt % to about 12 wt %) in an aqueous vehicle.

The preferred amounts of colorant are expressed as weight percent of the total weight of ink.

In another aspect, the present invention pertains to an ink set comprising a first, second ink and third ink, and optionally up to five more additional (fourth, fifth, sixth, seventh and eighth) inks. The first ink is the violet ink described above, and the second, third and any optional additional ink(s) are selected, in any combination, without duplication, from inks (a) through (g) as described above.

In yet another aspect, the present invention pertains to a method for ink jet printing, comprising the steps of:

(a) providing an ink jet printer that is responsive to digital data signals;

(b) loading the printer with a polyamide fabric to be printed;

(c) loading the printer with an inkjet ink set as set forth above; and (d) printing onto the substrate using the inkjet ink set in response to the digital data signals.

Optionally (and preferably), the process further comprises the following steps:

(e) heating the printed fabric with steam-treatment to set the printed inks, and (f) washing the steam-treated fabric.

In still another aspect, the present invention pertains to polyamide fabric article printed according the above inkjet printing method.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Colorants

The inks of the present ink set are characterized by the presence of particular, specified colorants. The colorants (dyes) are substantially soluble in the ink vehicle (aqueous).

Reference to the specified dyes is made by their "C.I." designation established by Society Dyers and Colourists, Bradford, Yorkshire, UK and published in the *The Color Index*, Third Edition, 1971. Sources of these dyes are generally well known to those of ordinary skill in the relevant art.

The present ink set is required to comprise an ink based on Acid Violet 48. The ink set further comprises at least one more additional ink, and optionally up to seven or more additional inks (up to eight or more total), wherein the colorant in each of the additional ink(s) is selected from the group consisting of Acid Yellow 79, Acid Blue 113, Acid Blue 26, Acid Blue 185, Acid Black 194, Reactive Red 245 and Reactive Orange 13, with each ink in the each set being based on a different dye. In each case, the specified dye is the primary or sole colorant in the ink.

Vehicle

The vehicle is a carrier for the colorant. An "aqueous vehicle" refers to a vehicle comprised of water or a mixture of water and at least one water-soluble organic solvent (co-solvent). Selection of a suitable mixture depends on requirements of the specific application, such as desired surface tension and viscosity, the selected colorant, and compatibility with substrate onto which the ink will be printed.

Examples of water-soluble organic solvents include alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether An aqueous vehicle will typically contain about 30% to about 95% water with the balance (i.e., about 70% to about 5%) being the water-soluble solvent.

Additives

Other ingredients, additives, may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.8 wt %, and more typically from about 80 wt % to about 99 wt %. Colorant is generally present in amounts up to about 15 wt %. For flag and banner applications, the colorant is typically in the range of from about 3 wt % to about 12 wt %. Percentages are weight percent of the total weight of ink.

Other ingredients (additives), when present, generally comprise less than about 15 wt %, based on the total weight of the ink. Surfactants, when added, are generally in the range of from about 0.2 wt % to about 3 wt %, based on the total weight of the ink. Polymers can be added as needed, but will generally be less than about 15 wt %, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Ink Set

The term "ink set" refers to all the individual inks or other fluids an inkjet printer is equipped to jet. The ink set of the present invention is required to contain an ink (first ink) based Acid Violet 48 (preferably from about 4 wt % to about 8 wt %) in an aqueous vehicle.

Additional inks in the ink set are preferably selected from inks (a) through (g) defined as previously defined. Thus, a second ink can be any one of inks (a) through (g). A third ink can also be any one of inks (a) through (g), provided that such third ink is not the same of inks (a) through (g) as selected for the second ink. A fourth ink can also be any one of inks (a) through (g), provided that such fourth ink is not the same of inks (a) through (g) as selected for the second and third inks. Likewise, five-, six-, seven- and eight-member ink sets can be constructed. The additional inks are all selected from inks (a) through (g) and each of these additional inks is different. The additional inks can be selected in any combination. The preferred amounts of colorant are expressed as weight percent of the total weight of ink.

Substrate

The instant ink set is especially advantageous for printing substrate that is synthetic polyamide fabric, and particularly flag and banner stock. Most commonly, the synthetic polyamide fabric fibers are nylon-6 and/or nylon-6,6 fibers. For flag and banner stock, the fabric is generally from about 70 to about 200 deniers. A commercial example of such stock is SolarMax® 185 bright Nylon 200 denier, SGS-667/50, prepared for print; and SolarMax® 185 bright HT Nylon 70 denier, SGS-773/76, prepared for print, both commercially available from Glen Raven Mills (Glen Raven, N.C.). Solar-Max® is a trademark of Invista.

The fabric is commonly pretreated prior to printing. Application of the pretreatment to the fabric can be any convenient method and such methods are generally well-known in the art. One example is an application method referred to as padding. In padding, a fabric is dipped in the pretreatment solution, then the saturated fabric is passed through nip rollers that squeeze out the excess solution. The amount of solution retained in the fabric can be regulated by the nip pressure applied by the rollers. Other pretreatment techniques include spray application wherein the solution is applied by spraying on the face or face and back of the fabric. The wet pick-up of pretreatment solution is preferably from about 20 and about 100 grams of solution, and more preferably from about 25 to about 75 grams of solution, per 100 grams of fabric.

After application of pretreatment the fabric is dried in any convenient manner. The final percent moisture is (approximately) equal to the equilibrium moisture of the pretreated fabric at ambient temperature, and can vary somewhat depending on the relative humidity of the surrounding air.

The resins remaining in the fabric after drying provide the absorbent layer for the inkjet inks during printing. It will be appreciated that sufficient resin must be present to absorb the ink load applied. On the other hand, the presence of too much resin may prevent proper penetration. Routine optimization will reveal appropriate coating levels for a given printer and ink set.

In addition to previously incorporated U.S. application Ser. No. 11/070711 (filed Mar. 2, 2005), other suitable pretreatments include those disclosed in U.S. Pat. No. 6,656,228 and US20020081421, the disclosures of which are incorporated by reference herein for all purposes as if fully set forth.

Printing Method

Printing can be accomplished by any inkjet printer equipped for handling and printing fabric. Commercial printers include, for example, the Dupont™ Artistri™ 3210 and 2020 printers, and the Mimaki TX series of printers.

The amount of ink laid down on the fabric can vary by printer model, by print mode (resolution) within a given printer and by the percent coverage need to achieve a given color. The combined effect of all these considerations is grams of ink per unit area of fabric for each color. In one embodiment, ink coverage is preferably from about 5 to about 17 grams of ink per square meter of fabric. There is a balance between the ink density needed to achieve a desired color and the absorption capacity of the coating resins in the pretreatment.

Printed fabric will typically be post-treated according to procedures well-known in the textile art. A preferred post treatment is to heat the printed fabric with steam-treatment to set the printed inks, and washing the steam-treated fabric.

EXAMPLES

Preparation of Inks

Inks were prepared according to the formulations in the following tables wherein amounts are ink weight percent of the total weight of ink. Ingredients were mixed together and filtered. Water was deionized. Colorants were "inkjet grade" meaning that they were relatively pure and free of excessive amounts of salts. Surfynol® 440 is a surfactant from Air Products Corp (Allentown, Pa., USA). Proxel™ GXL is a Biocide from Avecia (Wilmington, Del., USA). Trizma is tris(hydroxymethyl)aminomethane. PEG 4600 is polyethylene glycol (4400 to 4800 average molecular weight). If necessary, the pH was adjusted to the desired range (about 6.5 to about 7.5 for reactive dyes; about 8.5 to about 9.5 for acid dyes) with nitric acid.

| | Ink Color and Dye CI Number | | | | |
|---|---|---|---|---|---|
| | Yellow AY-79 | Navy AB-113 | Cyan AB-185 | Blue AB-260 | Violet AV-48 |
| Ingredients | | | | | |
| Dye | 8.95 | 6 | 4 | 6 | 6 |
| Ethylene glycol | 23 | 22 | 36.4 | 20 | 23 |
| 1,5-Pentanediol | 20 | 20 | — | — | 20 |
| Caprolactam | — | — | — | 3 | — |
| 2-Pyrrolidone | — | — | 10 | 17 | — |
| Glycerol | 5 | 8 | 5 | 10 | 10 |
| PEG 4600 | — | 1.25 | 4 | 1.75 | 0.45 |
| Surfynol® 440 | 1 | 1 | 1 | 1 | 1 |
| Proxel™ GXL | 0.2 | 0.2 | 0.2 | 0.2 | 0.2 |
| Trizma | 0.2 | 0.2 | 0.2 | 0.2 | 0.2 |
| Water (Balance to 100%) | Bal. | Bal. | Bal. | Bal. | Bal. |
| Properties | | | | | |
| pH | 8.5 | 8.5 | 9 | 8.5 | 8.5 |
| Viscosity (cps, 25° C.) | 8.85 | 9.2 | 9 | 8.9 | 9.22 |
| Surface Tension | 37.5 | 38.1 | 32 | 36 | 35.2 |

| | Ink Color and Dye CI Number | | |
|---|---|---|---|
| | Black AK-194 | Magenta RR-245 | Orange RO-13 |
| Ingredients | | | |
| Dye | 8 | 10 | 10 |
| Thiodiglycol | 40 | — | — |
| 2-Pyrrolidone | — | 5.25 | 5.26 |
| Glycerol | 10 | 10 | 10 |
| Propylene glycol | — | 20 | 20 |
| Polypropylene glycol | — | 3.8 | 4 |
| PEG 4600 | 0.75 | — | — |
| Surfynol® 440 | 1 | 0.25 | 0.25 |
| Proxel™ GXL | 0.2 | 0.2 | 0.2 |
| Trizma | — | 0.5 | 0.5 |
| Water (Balance to 100%) | Bal. | Bal. | Bal. |
| Properties | | | |
| pH | 5.5 | 7 | 7 |
| Viscosity (cps, 25° C.) | 9 | 7 | 7 |
| Surface Tension | 36 | 36 | 37 |

Print Tests

A DuPont™ Artistri™ 2020 printer was equipped with the yellow, navy, cyan, blue, violet, black, magenta and orange inks described above. The printer was also equipped with Solarmax® (200 denier nylon) fabric, which was pretreated according to previously incorporated U.S. application Ser. No. 11/070711 (filed Mar. 2, 2005). A variety of prints were made which were post treated by exposure to saturated steam (15 psig, 120° C.) followed by washing twice, first in cold water for 5 minutes, then warm water (60° C.) for 10 minutes.

After post treatment, the prints all showed good color and good penetration so that the prints were of substantially similar color density on both sides of the fabric with little or no bleed.

It should be noted that penetration and bleed are, in part, related to choice of dye, and not all dyes have similarly good bleed characteristics under the same conditions. The dyes specified herein are particularly advantageous as regards penetration and bleed.

The prints were evaluated for lightfastness (Xenon lamp for 40 hours) according to MTCC method 16 (ISO 105-B02). Results are summarized in the following table. A higher number rating means better lightfastness (less color fade). For flags and banners, a rating of 3 is minimally acceptable, but a rating of 4 or 5 is preferred.

| Ink (Dye) | Light Fastness rating |
|---|---|
| Yellow Ink (AY-79) | 3–4 |
| Navy Ink (AB-113) | 4–5 |
| Cyan Ink (AB-185) | 2 |
| Blue Ink (AB-260) | 4–5 |
| Violet Ink (AV-48) | 4 |
| Black Ink (AK-194) | 4 |
| Magenta Ink (RR-245) | 3–4 |
| Orange Ink (RO-13) | 4 |

As can be seen, seven of the eight inks had a lightfastness rating of at least three. The exception was the cyan ink, which had a less than desirable rating of 2. However, the cyan ink herein was a compromise of lightfastness and many other necessary properties including jetting performance, color, penetration, bleed and more. Preferably, for printing flags and banners, each ink in the ink set has a lightfastness rating of at least 3.

The invention claimed is:

1. A dye-based inkjet ink set comprising at least two differently colored inks, wherein at least one of the inks is a first ink which is a violet ink comprising Acid Violet 48 dye in an aqueous vehicle.

2. The dye-based ink set of claim 1, wherein the first ink comprises the Acid Violet 48 dye in an amount of from about 4 wt % and about 8 wt %, based on the total weight of ink.

3. The dye-based ink set of claim 1, further comprising one or more of inks (a) through (g) defined as follows:
    (a) a yellow ink comprising Acid Yellow 79 dye in an aqueous vehicle;
    (b) a navy ink comprising Acid Blue 113 dye in an aqueous vehicle;
    (c) a blue ink comprising Acid Blue 260 in an aqueous vehicle;
    (d) a cyan ink comprising Acid Blue 185 in an aqueous vehicle;
    (e) a black ink comprising Acid Black 194 in an aqueous vehicle;
    (f) a magenta ink comprising Reactive Red 245 in an aqueous vehicle; and/or
    (g) an orange ink comprising Reactive Orange 13 in an aqueous vehicle.

4. The dye-based ink set of claim 2, further comprising a second ink that is selected from the group consisting of inks (a) through (g), and a third ink that is selected from the group consisting of inks (a) through (g), provided that such third ink is not the same of inks (a) through (g) as selected for the second ink.

5. The dye-based ink set of claim 4, further comprising a fourth ink that is selected from the group consisting of inks (a) through (g), provided that such fourth ink is not the same of inks (a) through (g) as selected for the second and third inks.

6. The dye-based ink set of claim 1, further comprising:
    (a) a second ink that is a yellow ink comprising Acid Yellow 79 dye in an aqueous vehicle;
    (b) a third ink that is a navy ink comprising Acid Blue 113 dye in an aqueous vehicle;
    (c) a fourth ink that is a blue ink comprising Acid Blue 260 in an aqueous vehicle;
    (d) a fifth ink that is a cyan ink comprising Acid Blue 185 in an aqueous vehicle;
    (e) a sixth ink that is a black ink comprising Acid Black 194 in an aqueous vehicle;
    (f) a seventh ink that is a magenta ink comprising Reactive Red 245 in an aqueous vehicle; and
    (g) an eighth ink that is an orange ink comprising Reactive Orange 13 in an aqueous vehicle.

7. The dye-based ink set of claim 2, further comprising one or more of inks (a) through (g) defined as follows:
    (a) a yellow ink comprising from about 7 wt % to about 11 wt % Acid Yellow 79 dye in an aqueous vehicle;
    (b) a navy ink comprising from about 4 wt % to about 8 wt % Acid Blue 113 dye in an aqueous vehicle;
    (c) a blue ink comprising from about 4 wt % to about 8 wt % Acid Blue 260 in an aqueous vehicle;
    (d) a cyan ink comprising from about 2 wt % to about 6 wt % Acid Blue 185 in an aqueous vehicle;
    (e) a black ink comprising from about 6 wt % to about 10 wt % Acid Black 194 in an aqueous vehicle;
    (f) a magenta ink comprising from about 8 wt % to about 12 wt % Reactive Red 245 in an aqueous vehicle; and/or
    (g) an orange ink comprising from about 8 wt % to about 12 wt % Reactive Orange 13 in an aqueous vehicle.

8. The dye-based ink set of claim 7, further comprising all of inks (a) through (g).

9. A method for ink jet printing onto a fabric, comprising the steps of:
    (a) providing an ink jet printer that is responsive to digital data signals;
    (b) loading the printer with a polyamide fabric substrate to be printed;
    (c) loading the printer with a dye-based inkjet ink set comprising at least two differently colored inks, wherein at least one of the inks is a first ink which is a violet ink comprising Acid Violet 48 dye in an aqueous vehicle; and
    (d) printing onto the polyamide fabric substrate using the dye-based inkjet ink set in response to the digital data signals.

10. The method of claim 9, further comprising the steps of:
    (e) heating the printed fabric with steam-treatment to set the colors, and
    (f) washing the steam-treated fabric.

11. The method of claim 9, wherein the polyamide fabric is flag and banner stock.

12. The method of claim 9, wherein the polyamide fabric substrate is printed to an ink coverage of from about 5 to about 17 grams of ink per square meter of fabric.

13. The method of claim 9, wherein the first ink comprises the Acid Violet 48 dye in an amount of from about 4 wt % and about 8 wt %, based on the total weight of ink.

14. The method of claim 9, wherein the dye-based ink set further comprises one or more of inks (a) through (g) defined as follows:
- (a) a yellow ink comprising Acid Yellow 79 dye in an aqueous vehicle;
- (b) a navy ink comprising Acid Blue 113 dye in an aqueous vehicle;
- (c) a blue ink comprising Acid Blue 260 in an aqueous vehicle;
- (d) a cyan ink comprising Acid Blue 185 in an aqueous vehicle;
- (e) a black ink comprising Acid Black 194 in an aqueous vehicle;
- (f) a magenta ink comprising Reactive Red 245 in an aqueous vehicle; and/or
- (g) an orange ink comprising Reactive Orange 13 in an aqueous vehicle.

15. The method of claim 14, wherein the dye-based ink further comprising all of inks (a) through (g).

16. A polyamide fabric article printed according the method of claim 9.

17. The polyamide fabric article of claim 16, wherein the method further comprises the steps of:
- (e) heating the printed fabric with steam-treatment to set the colors, and
- (f) washing the steam-treated fabric.

18. The polyamide fabric article of claim 16, wherein the polyamide fabric is flag and banner stock.

* * * * *